United States Patent [19]
Fitzgibbon

[11] Patent Number: 5,464,585
[45] Date of Patent: Nov. 7, 1995

[54] METHOD OF INJECTION MOLDING ARTICLES WITH SELECTIVE CONCENTRATIONS OR GRADIENTS OF MATERIALS

[75] Inventor: Denise R. Fitzgibbon, Hockessin, Del.

[73] Assignee: Metton America, Inc., Abingdon, Va.

[21] Appl. No.: 177,103

[22] Filed: Jan. 3, 1994

[51] Int. Cl.⁶ .................................................. B29C 45/14
[52] U.S. Cl. .................. 264/108; 264/328.2; 264/328.6; 264/328.12; 264/328.18
[58] Field of Search .......................... 264/328.6, 328.18, 264/255, 108, 328.2, 328.12; 425/130

[56] References Cited

U.S. PATENT DOCUMENTS

| | | |
|---|---|---|
| 2,418,856 | 4/1947 | Stacy . |
| 3,221,373 | 12/1965 | Kwan . |
| 3,513,060 | 5/1970 | Krystof . |
| 3,531,553 | 9/1970 | Bodkins . |
| 3,716,612 | 2/1973 | Schrenk et al. . |
| 3,764,642 | 10/1973 | Boutillier . |
| 3,793,415 | 2/1974 | Smith . |
| 3,846,223 | 11/1974 | Lederman et al. . |
| 3,873,656 | 3/1975 | Garner . |
| 3,894,823 | 9/1975 | Hanning . |
| 3,906,066 | 9/1975 | Barrie . |
| 3,947,177 | 3/1976 | Eckardt . |
| 3,966,372 | 6/1976 | Yasuike et al. . |
| 3,976,226 | 8/1976 | Monnet . |
| 4,014,966 | 3/1977 | Hanning . |
| 4,035,466 | 7/1977 | Langecker . |
| 4,052,497 | 10/1977 | Monnet . |
| 4,115,491 | 9/1978 | Hanning . |
| 4,140,672 | 2/1979 | Kataoka . |
| 4,155,969 | 5/1979 | Hendry . |
| 4,201,742 | 5/1980 | Hendry . |
| 4,247,515 | 1/1981 | Olabisi . |

(List continued on next page.)

FOREIGN PATENT DOCUMENTS

| | | |
|---|---|---|
| 2664531 | 1/1992 | France ..................................... 264/255 |
| 965442 | 6/1957 | Germany . |
| 1015341 | 9/1957 | Germany . |
| 1177326 | 9/1964 | Germany . |
| 3938891 | 5/1990 | Germany ............................... 264/255 |
| 51-41050 | 4/1976 | Japan ...................................... 264/255 |
| 354837 | 8/1930 | United Kingdom . |
| 1219097 | 1/1971 | United Kingdom . |
| 1339445 | 5/1973 | United Kingdom . |

OTHER PUBLICATIONS

C. W. Macosko, "RIM, Fundamentals of Reaction Injection Molding", (New York: Hanser Pubs., Oxford Univ. Press, 1989).

Primary Examiner—Jeffery R. Thurlow
Attorney, Agent, or Firm—Fitzpatrick, Cella, Harper & Scinto

[57] ABSTRACT

The invention provides an improved process for molding articles having a bulk material and an auxiliary material, such as an additive, a comonomer, or a catalyst, present in the bulk material as a fixed concentration strip or in a concentration gradient in the direction from the surface to the interior. The invention is especially useful for concentrating surface-enhancing auxiliary materials at the surface of an article without wasting the auxiliary material in the interior of the article where it provides minimal value. This invention is also applicable to concentrating an interior-enhancing auxiliary material in the interior of the article without degrading surface sensitive properties. The method for manufacturing an as-molded article having a bulk material and an auxiliary material provided therein generally comprises injecting a moldable bulk material composition into a mold with an essentially laminar flow profile such that the earlier injected material will reside at the surface of the mold (i.e., the surface of the manufactured article) and the later injected material will constitute the interior portion of the article, and controlling the injection of the auxiliary material during filling of the mold with the bulk material to direct the auxiliary material to a desired location within the bulk material.

25 Claims, 4 Drawing Sheets

U.S. PATENT DOCUMENTS

| | | | |
|---|---|---|---|
| 4,497,763 | 2/1985 | Monnet . | |
| 4,520,181 | 5/1985 | Klosiewicz | 264/328.6 |
| 4,571,319 | 2/1986 | Baluch et al. | 264/255 |
| 4,670,199 | 6/1987 | Montet et al. | 264/255 |
| 4,835,230 | 5/1989 | Khasat et al. | 264/328.6 |
| 4,900,799 | 2/1990 | Hara et al. | 264/328.6 |
| 4,952,348 | 8/1990 | Ishimaru et al. | 264/328.6 |
| 4,977,226 | 12/1990 | Sugawara et al. | 264/328.6 |
| 4,978,493 | 12/1990 | Kersemakers et al. . | |
| 5,096,644 | 3/1992 | Endo et al. | 264/328.6 |
| 5,102,589 | 4/1992 | Chono et al. | 264/328.6 |
| 5,147,950 | 9/1992 | Kelsey | 264/328.6 |
| 5,202,074 | 4/1993 | Schrenk et al. . | |
| 5,266,370 | 11/1993 | Woodson et al. | 428/36.92 |

METHOD OF INJECTION MOLDING ARTICLES WITH SELECTIVE CONCENTRATIONS OR GRADIENTS OF MATERIALS

BACKGROUND OF THE INVENTION

1. Field of the Invention

The present invention relates to a novel method for injection molding, especially reaction injection molding, articles having an auxiliary material present, at a particular location within the article's bulk material, at a :fixed concentration strip or in a concentration gradient, and to the novel articles so made.

2. The State of the Art

There are a variety of uses for injection molded, polymeric articles. One of the most common types of articles is food packaging, generally made of foamed polystyrene. Because these articles retain liquids, and usually have a surface which is seen by consumers, the injection molding art has devised a number of ways to produce an article having a cover layer and a core; typically the core is foamed and the cover is dense. In the manufacture of articles having a foamed core and a cover layer, two components are injected sequentially into a mold cavity; the first portion comprises the cover layer and the second portion comprises a foamable material to provide the core. Mixing of the materials comprising the first and second portions is detrimental to forming an integral cover layer.

One solution that avoids mixing is described by Garner in GB 1,219,097, by which a third portion of material identical to the cover material of the first portion is injected after the second portion of core material. This order of injection insures that the first portion of material injected for the next article molded is comprised of the cover material, and so the portion of the sprue removed from the article will not contain any portion of foamed material (which would disrupt the integrity of the cover layer). A variation of this method is described by Garner in GB 1,339,445, in which this general concept is applied to a mold having multiple sprue channels. Other methods for solving this type of problem include the simultaneous injection of the cover and core portions using special injection nozzles adapted to extrude the core material physically within the cover material, as described by Hanning in U.S. Pat. No. 3,894,823 and in U.S. Pat. No. 4,014,966 and by Langecker in U.S. Pat. No. 4,035,466, and with molds having movable sections, as described by Barrie in U.S. Pat. No. 4,906,066.

In general, these types of production methods are intended for use with articles formed from two polymeric components which are immiscible, or which are injected or extruded into the mold in the laminar flow regime to avoid mixing. It is known that laminar flow for filling a particular mold geometry in the proper orientation with respect to gravity will result in the earlier injected material residing along the mold surface, corresponding to the surface of the molded article, with the later injected material residing in the interior of the part. See generally C. W. Macosko, RIM Fundamentals of Reaction Injection Molding (New York: Hanser Publishers, dist. by Oxford University Press, 1989), Chpt. 4–6. One example exploiting this ability to inject without mixing is described with respect to the formation of artificial flowers by Kwan, in U.S. Pat. No. 3,221,373, in which a first material of one color is injected into a mold to partially fill the mold, and then a second plastic of a different color is injected so as to travel through the first injected portion and pierce its surface. Another example is given by Schrenk et al., in U.S. Pat. No. 3,716,612, in which two or more thermoplastic materials are injected so as to provide separate phases disposed in a plurality of thin layers wherein each layer corresponds to the particular composition of the respective injected material. Immiscibility may be favored by using fluids of differing viscosities; Kataoka, in U.S. Pat. No. 4,140,672, and Monnet, in U.S. Pat. No. 4,497,763, describe first injecting to partially fill a mold with a fluid having a relatively low viscosity at the molding temperature, and thereafter injecting either a second fluid having a higher viscosity as the core component or a gas to produce a hollow article.

A problem arises in the loss of adhesion between the adjacent layers of immiscible components as the adjacent materials become more dissimilar. Loss of integrity can be diminished by injecting a third, adhesive material coextensively with the first two using various types of nozzle configurations, as described by Monnet in U.S. Pat. No. 3,976,226 and in U.S. Pat. No. 4,052,497.

Other disclosures representative of the foregoing art may be found in the following:

| | | | |
|---|---|---|---|
| Leggat | GB 354,837 | Steinmann | DE-B 965,442 |
| Unda | DE-A 1,015,341 | Périssé | DE-A 1,177,326 |
| Stacy | US 2,418,856 | Krystof | US 3,513,060 |
| Bodkins | US 3,531,553 | Boutillier | US 3,764,642 |
| Smith | US 3,793,415 | Lederman et al. | US 3,846,223 |
| Garner | US 3,873,656 | Yasuike et al. | US 3,966,372 |
| Hanning | US 4,115,491 | Hendry | US 4,155,969 |
| Hendry | US 4,201,742 | Olabisi | US 4,247,515 |
| Schrenk et al. | US 5,202,074 | | |

The foregoing production methods are confined to the production of an article having a single composition or one having multiple layers each consisting of a single composition. The art is typically concerned with articles having a foamed or reinforced core and a good surface appearance provided by a coating layer, essentially a multilayer article consisting of core and coating layers. In practice, it is often difficult to control the thickness of the coating layer by use of the prior art methods. Additionally, a separate coating layer carries a number of disadvantages. As mentioned previously, adhesion between the adjacent layers becomes more problematic as the chemical and physical nature of the immiscible prepolymers and/or polymers diverge. Still further, the integrity of a surface layer exposed to the elements, such as an automobile or spacecraft part, can be compromised by collisions with debris and degradation by exposure to sunlight and temperature variations. A crack in a coating layer jeopardizes the integrity of the entire part. Nevertheless, the art has continued to employ molding techniques which simulate, often to an improved degree, the manufacture of an article by lamination techniques; that is, by molding discrete layers wherein each layer is comprised of a uniform composition throughout, where the outermost layer constitutes a shell or coating layer. These techniques are accompanied by the further problems of intricate injection nozzles and one or more separate coating steps for surface layers.

SUMMARY OF THE INVENTION

One of the objects of this invention is to provide a novel as-molded article comprising a bulk material and a selective concentration, such as a fixed concentration strip or a concentration gradient, of an auxiliary material at a particular location within the bulk material, wherein the gradient runs in the direction from the surface of the article to the interior of the article; exemplary auxiliary materials include typical polymeric additives, other moldable compositions, and curing catalysts.

Another object is to provide as-molded articles having one or more auxiliary materials concentrated on the surface of the article, especially for enhancing such properties as color, oxidation resistance, fire resistance, hardness, stiffness, toughness, elasticity, heat resistance, and the like. Another object of this invention is to provide a method for the expeditious use of relatively expensive auxiliary materials, such as a catalyst and/or catalyst initiator or activator for polymerization, whereby such materials are concentrated in those areas of the article where their effect is beneficially exhibited.

Still a further object of this invention is to provide an as-molded article comprising a bulk material and one or more auxiliary materials disposed at a particular portion of the article.

In addition to achieving the foregoing objectives, this invention provides an as-molded article having a surface portion and an interior portion, the article comprising a bulk material and auxiliary material disposed in the bulk material at a different concentration in the surface portion than in the interior portion. The bulk material contains at any point at least 50% by volume of a particular material; for example, an alloy or blend of polymers such that at any point the bulk materials contains at least 50% of the polymer blend.

Another object of this invention is to provide a novel enhancement to an as-molded article comprising a bulk material by directing one or more auxiliary materials to one or more locations in the bulk material during molding of the article where the effect of the auxiliary material(s) is advantageously manifest in the as-molded article.

Yet another object of this invention is to provide an improvement in conventional techniques for molding articles having multiple layers of bulk materials, and to the articles so made, by providing in one or more such layers an auxiliary material at a desired location within the bulk material of a particular layer, the location being provided with a concentration gradient or a fixed concentration strip of rile auxiliary material.

In addition to achieving the foregoing objectives, this invention also provides a process for making an as-molded article of manufacture which comprises injecting into a mold a moldable composition comprising a bulk material, during the injection of the bulk material also injecting an auxiliary material in a controlled manner effective to direct the auxiliary material to portions of the mold corresponding to particular portions of the bulk material in the as-molded article, and solidifying the moldable composition to provide an as-molded article. Control of the injection of the auxiliary material involves injecting the moldable composition under laminar flow conditions, and manipulating the duration and rate of injection of the auxiliary material as well as performing the injection over a particular duration of the time during which the mold is being filled so as to provide the particular fixed concentration or concentration gradient in a particular location and to a desired thickness within the bulk material. In a more particular embodiment, the invention provides a process of molding wherein the auxiliary material is directed to the vicinity of the mold walls corresponding to the surface portion of the article molded., especially useful where the auxiliary material provides surface-enhancing properties (such as improved appearance).

As such, this invention also provides a method of molding which comprises injecting a moldable, preferably polymerizable, bulk material and during such molding simultaneously injecting an auxiliary material, e.g., an additive and/or another moldable composition, wherein the ratio of the auxiliary material relative to that of the bulk composition is deliberately varied over time. The variation in the injection of the auxiliary material can be controlled to produce an article having a concentration gradient of the auxiliary material in the bulk material in the direction from the surface to the interior of the article, or the auxiliary material can be provided in a fixed concentration strip or pseudolayer (e.g., a concentration gradient which changes in a step function) in the bulk material of the as-molded article. The ratio for surface-enhancing materials for monolithic articles is preferably greatest at the start of the injection cycle and diminishes rapidly over time.

The as-molded article may be monolithic, cast as a single piece having only the bulk and auxiliary materials, or may be multilayered, wherein each layer contains a different bulk material.

This method is preferably practiced with reaction injection molding (RIM). One particular embodiment of the invention includes injecting two bulk material streams having essentially the same composition, one stream containing a catalyst and the other containing an activator for the catalyst, and injecting a third stream comprising the auxiliary material, and varying the amount of the third stream added to the other streams to provide a selective concentration or a concentration gradient of the auxiliary material with respect to the surface and the interior portions of the article. The auxiliary material may also be a component of one of two or more co-polymerizable streams. Thus, another embodiment of the invention includes providing two compositions which can react with each other (e.g., an isocyanate and a polyol, to produce a polyurethane) and injecting these reactive compositions into a mold while simultaneously injecting an auxiliary :material dispersed or dissolved in one of the two reactive compositions, or dispersed or dissolved in some other medium.

DETAILED DESCRIPTION OF SPECIFIC EMBODIMENTS

The present invention is particularly applicable to reaction injection molding ("RIM"), and so will generally be described in such terms, although the invention is applicable to any molding process in which a mold in a proper geometry and orientation can be filled laminarly with a material such that the earlier injected material resides along the mold surface corresponding to the surface portion of the article and the later injected material resides in the interior of the article.

Orientation of the mold, gate location, and similar molding concerns can be first addressed using commercially available fluid flow simulations: C-FLOW and C-SET from AC Technology, Ithaca, N.Y.; FIDAP from Fluid Dynamics International, Evanston, Ill.; and FLUENT from Creare.X, Hanover, N.J.; the disclosures of which are all incorporated herein by reference. Thereafter, routine experimentation can be used to determined the optimal particulars for filling the mold to achieve a laminar flow profile such that the earlier injected material resides along the mold surfaces and the later injected material resides in the interior.

As is evident at least from some of the aforedescribed prior art, it is known how to arrange a mold cavity to be filled under laminar flow such that the earlier injected material becomes the surface of the molded article and the later injected material becomes the interior portion. (See, e.g., Macosko, op. cit.) In the present invention, an auxiliary material is injected in a deliberately time-varying manner into the bulk material stream during filling of the mold effective to provide a selective concentration of the auxiliary material within the bulk material, such as a fixed concentration strip or a concentration gradient in the direction from the surface to the interior. The fixed concentration strip can be located on the surface of the article, in the center, or anywhere in the interior, and generally is disposed parallel to the surface of the article; the "strip" may be of any desired thickness (or thinness) depending upon the control of the auxiliary material injection. With this invention the surface composition can be varied in a desired manner. Some examples of parts in which the application of this invention will find utility are: vehicle components such as bumpers, hoods, fenders, panels, air deflectors, spoilers, ground effects, and the like for automobiles, motorcycles, trucks/vans, snowmobiles, golf carts, boat hulls and decks, industrial equipment, and the like; architectural moldings, plinths, columns, and decorative surfaces; medical equipment; cabinetry for consumer, industrial, and medical electronics; appliances such as washing machines and refrigerators; fixtures such as sinks, showers, tubs, toilets, and hot tubs; vending machines and other dispensing apparatus; home and industrial agricultural equipment such as mowers, tractors, silos, and wheel barrows; railroad equipment such as box cars and coaches; aerospace components; storage and shipping vessels, containers, trays, pallets, and bins; chlorine cell covers; packing for distillation towers; pipe and tubing; gaskets; solar collectors; indoor and outdoor furniture; toys, bicycles, and sports equipment such as guards and protectors; food vessels such as plates, cups, bottles, and other packaging, carrying, or dispensing articles; and generally anywhere plastic parts can be used. The wide variety of uses that have evolved for structural plastics since their discovery can all be enhanced by the practice of the present invention.

In the articles of the prior art, protective coatings or paints are typically applied to confer various aspects of protection. For example, an intumescent paint may be used to provide fire resistance, a UV absorbent coating may be used to protect the substrate from oxidation, a hard coating may be applied to impart scratch resistance, inert coatings may be applied to impart solvent or electrical resistance, conductive coatings may be applied to impart conductivity or shielding characteristics, and so on. In many instances, paint does not provide adequate UV protection, or is subject to chipping and/or cracking; while typically hard, paint is generally not flexible. Other problems typical with coatings include delamination and the like as discussed above regarding the background of this invention.

In one embodiment of the present invention, as a moldable bulk material is injected into a mold, a stream containing a surface-enhancing auxiliary material is injected simultaneously with the moldable stream, and the amount of the auxiliary material injected is varied over time effective to provide a different concentration near the mold surface than in the interior of the molded composition. The resultant part has a higher concentration of the surface-enhancing additive at its surface. In this manner, an article having a bulk composition is provided with an integral surface portion that functions better than the manner of the prior art coatings and separate surface layers, and without the prior art problems associated with intricate injection nozzles, adhesion of the surface layer, a separate coating step, and the like. Because the auxiliary material is intimately admixed with the bulk material, there are no delamination or chipping problems, even if the bulk material itself chips or cracks.

The bulk material is generally any moldable composition that can be provided in a fluid form that suitable for injection into a mold, and then solidified into a molded article. Moldable compositions can be thermoplastic, which solidify upon a temperature change, or polymerizable, including thermosets which solidify or cure by chemical reaction. As used herein, "bulk material" in a particular context may refer to moldable material before solidification or to solidified, as-molded material. As used herein, "injection", "injecting", and the like are meant to include any means for introducing a moldable composition into a mold, including under pressure, by gravity, by centrifugal force, and by other conventional methods for mold filling.

The bulk material may be a single material or a homogeneous mixture of materials, provided that any portion of the bulk material portion of the as-molded article contains at least 50% by volume of that same bulk material. The single material may be a polymer, such as one selected from the group consisting of polyalkylene and polycycloalkylene homopolymers such as polyethylene, polypropylene, polystyrene, poly(dicyclopentadiene) and copolymers including two or more monomers selected from the group consisting generally of $C_{2-16}$ alkylenes, cycloalkylenes, and aralkylenes, including styrene, maleic anhydride, and the like; polyureas; polyurethanes; polyester urethanes including modified ones such as STRUCTON™ resin (available from Hercules Incorporated, Wilmington, DE); epoxy resins; phenolic resins; elastomers; and compatible mixtures, blends, and alloys thereof which are moldable.

Preferred materials for the bulk material are thermosets comprised of dicyclopentadiene (DCPD), tricyclopentadiene (TCPD), and mixtures thereof, which can be formed by reaction injection molding: typically, poly(DCPD) articles are RIMed by simultaneously injecting two streams of DCPD into a mold, one stream additionally comprising a catalyst and the other stream additionally comprising a material which activates the catalyst, thereby initiating polymerization when mixed. Other cycloolefins containing at least one norbornene group that can be combined with DCPD to form thermoset copolymers include norbornene, norbornadiene, phenyl norbornene, tetracyclododecene, tetracyclododecadiene, ethylidenenorbornene (ENB), ethylidene tetracyclododecene, higher cyclopentadiene oligomers, and mixtures thereof; suitable comonomers containing polar groups include norbornene derivatives such as cyanonorbornene, norbornene carboxylic acid esters, and pyridyl norbornene. Exemplary methods, compositions, and catalysts are described in U.S. Pat. Nos. 4,400,340, 4,469,809, 4,496,668, 4,689,380, 5,019,544, and 5,268,232, the disclosures of which are all incorporated herein by reference. These types of materials are commercially available as METTON® liquid molding resins (available from Hercules incorporated, Wilmington, Del.).

The bulk material may also comprise an alloy, blend, or other mixture of materials that is essentially homogeneous. For example, it may comprise a blend of polyethylene and polypropylene, or polypropylene and a polyester (e.g., poly(ethylene terephthalate)). The bulk material may also comprise a compatible combination of thermoplastic materials and thermosettable materials, such that after molding the bulk material contains a blend of the thermoplastic and thermosettable materials.

Suitable auxiliary materials for altering the color of the molded article include carbon black (for black) and titanium dioxide (for white), either alone or in admixture with pigments and/or dyes conventionally used for coloring a particular polymeric composition. Other suitable colorants employed in the bulk coloration of plastic articles are described in. U.S. Pat. Nos. 4,918,138 and 4,607,033, the disclosures of which are incorporated herein by reference. Altering the color of the surface of the article is important for providing a more consumer-oriented appearance. Coloration is especially useful where the natural color of the molded resin is unappealing or in certain applications where the resin is transparent or translucent. Accordingly, these materials are present in amounts effective to alter the appearance of the as-molded article.

Suitable auxiliary materials for improving the fire resistance and/or smoke generation of the molded article include phosphorus compounds, halogen compounds, boron compounds, antimony compounds, alumina trihydrate, and the like, including those disclosed in U.S. Pat. Nos. 4,994,535 and 4,740,537, the disclosures of which are incorporated herein by reference. Generally, these fire resistance auxiliary materials should be present at or near the surface portion of the article in amounts of from about 1% to about 30% by weight.

Suitable auxiliary materials for improving the oxidation resistance of the molded article include phenolic compounds such as BHA and BHT (butylated hydroxyanisole and butylated hydroxytoluene, respectively), substituted and unsubstituted diphenylamines, HALS (hindered amine light stabilizers), and the like, including those materials disclosed in U.S. Pat. No. 4,822,839, the disclosure of which is incorporated herein by reference. Generally, these oxidation resistance auxiliary materials should be present at or near the surface portion of the article in amounts of from about 0.1% to about 10% by weight.

Suitable auxiliary materials for improving the hardness of the molded article, especially at the surface, include metal and/or ceramic particles in powder, fiber, whisker, and/or platelet forms, of which the ceramics are typically comprised of silica or a silica-based material (e.g., an aluminosilicate), alumina, and the like. Generally, these hardness-improving auxiliary materials should be present at or near the surface in amounts of from about 0.1% up to 50% by weight.

Many auxiliary materials are added particularly to protect the surface of the article because damage to the article typically results from external forces and compositions. Some articles, such as surf boards, skate boards, diving boards, basketball backboards, and the like, are intended to be subjected to outside forces, while vehicle bodies, material containers and vessels, architectural materials, and piping and tubing are intended to be subjected to exposure to natural erosive forces and/or handle synthetic materials. Because damage is usually caused by surface effects, concentration of surface-enhancing auxiliary materials at the surface of the article is beneficial, and is especially cost effective due to the relatively large marginal cost of these types of auxiliary materials.

The wide variety of uses for plastics allows for the present invention to provide a broad definition of auxiliary material, such that the bulk material comprises at least 50% by volume of the stone composition throughout. Depending upon the particular application of the manufactured article, it may be more beneficial to have a maximum amount of the bulk composition. For example, when the application of a particular part requires antioxidant protection, especially if the auxiliary material is relatively expensive, only a relatively thin portion of the surface of a monolithic part containing the bulk material needs to be modified or enhanced; e.g., an amount of 0.5% by weight in the outer 5% of the total thickness of the; part. Surface-enhancing auxiliary materials such as colorants and antioxidants will generally be present in the surface portion of an article at depths from the surface ranging from about 3 mil to about 250 mil with a thickness of generally between 1 mil and 500 mil. On the other hand, if the application involves being constantly subjected to structural forces, a more significant modification of the bulk material in the surface portion may be desirable; for example, an amount of 25% by weight of a ceramic filler in the outer 20% of the total thickness of the part.

Surface and other properties of the article can also be modified by deliberately changing the composition of the moldable material, for example by varying the amount of comonomer in a given portion of the article. For instance, in the molding of a monolithic article having dicyclopentadiene (DCPD) as the bulk material, a higher comonomer, such as tricyclopentadiene (TCPD), can be injected such that its concentration is lowest at the surface of the article. By this technique, the stiffer poly(DCPD-co-TCPD) is present throughout most of the article, providing a higher glass-transition temperature and thus a higher heat distortion temperature (HDT) for the article. The surface of the as-molded article is comprised mostly of poly(DCPD), whereby the impact strength (e.g., notched Izod), a surface property, is enhanced. Accordingly, moldable materials having particular physical properties (glass transition temperature, stiffness, toughness, elasticity, etc.) can be directed to a particular portion of the mold, resulting in an article having desired properties in desired portions thereof where the effect of the auxiliary material is beneficially manifest. The auxiliary material can be a comonomer in a curable thermoset composition (e.g., the TCPD) or a compatible composition separately co-polymerizable along with the bulk material.

Some conventional additives used for polymeric compositions bloom or migrate, either incidentally or by design, to the surface of the article some time after molding due to diffusion through or incompatibility with the bulk material. The present invention can provide an article which, as it emerges from the mold (i.e., as-molded), comprises a concentration gradient of one or more auxiliary materials. Accordingly, another benefit of the present invention and the products made therefrom is an article of manufacture having a concentration gradient of an auxiliary material which normally does not migrate or diffuse in the bulk material, and a method for its production. Likewise, the present invention allows for directing an auxiliary material to a particular location within the bulk material and controlling the amount of auxiliary material in that location. The ability to control the location and concentration of the auxiliary material overcomes problems with intended or incidental migration because the as-molded article has the desired concentration of the auxiliary material in the desired location immediately as formed. The ability to control the molding process offered by this invention will also allow the artisan to control the thickness of the bulk material portion containing the auxiliary material.

The present invention can provide an article containing a bulk material and having a concentration gradient of an auxiliary material either increasing or decreasing in the direction from the surface of the article to it interior. It is also possible to create an as-molded article having multiple auxiliary materials at discrete portions to provide a plurality of beneficial effects. A plurality of auxiliary materials may be added sequentially in discrete portions to a bulk material stream during injection to provide, with reference from the surface to the interior portion of the as-molded article, the properties of improved surface finish, toughness, stiffness, fire resistance, oxidation resistance, and elasticity. Employing the prior art techniques would have required multiple laminating or coating or painting operations of a duplicative nature; employing the present invention by means of the apparatus next described allows for a single forming operation.

Figure 1:
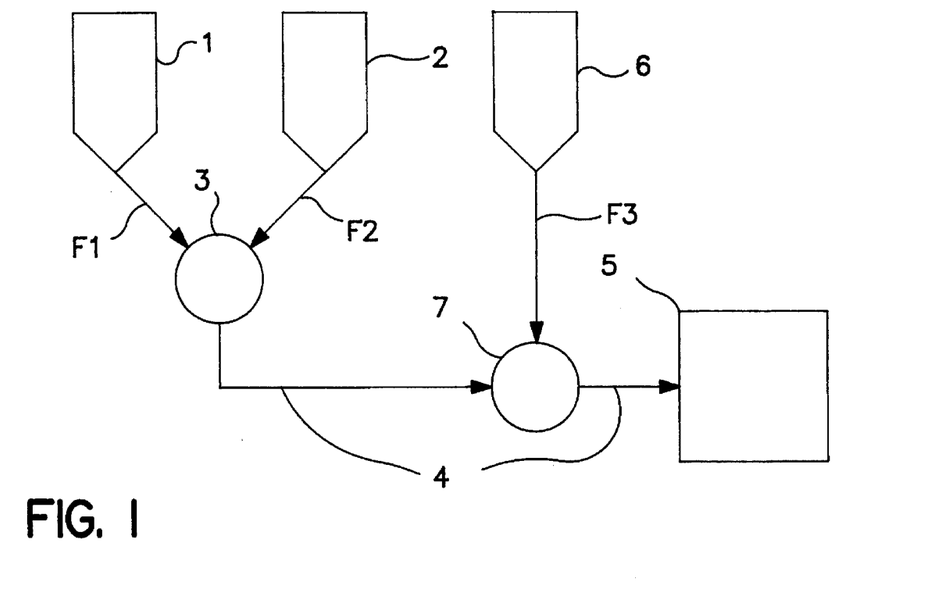
FIG. 1 is a schematic flow diagram illustrating one embodiment of the invention.

With reference to FIG. 1, vessels 1 and 2 each contain the same moldable bulk material, with one of the vessels further comprising a catalyst and the other vessel further comprising an initiator or activator for the catalyst. The contents of these vessels are joined in mixer 3 and directed by line 4 into mold 5. According to the present invention, an auxiliary material composition contained in vessel 6 is added to the bulk material in mixer 7 disposed in line 4 during a desired portion of the injection cycle. Devices for controlling the flow are not shown; likewise, mixing can be accomplished by various static or dynamic means so long as the injected materials are well-mixed.

Flow meters F1, F2, and F3 measure the amount of material being injected from vessels 1, 2, and 6, respectively (assuming, for ease of discussion, that the flow lines have a negligible volume). The idealized readings from these meters are shown in the timing diagram of FIG. 2: along the ordinate, $t_0$ represents the time at which injection from vessels 1, 2, and 6 is started; $t_f$ is the time at which injection from vessels 1 and 2 is completed; and $t_a$ is some intermediate time at which injection of the auxiliary material is started or stopped (in various embodiments, as measured by F3); and, along the abscissa, the flows from each of the meters is represented as "0" being no flow and "1" being full flow. By deliberately varying the time during mold filling when the auxiliary material is injected along with the bulk material, the rate at which the auxiliary material is injected, and/or the duration of the auxiliary material injection with respect to the total time for filling the mold, articles can be made which have a fixed concentration or concentration gradient of the auxiliary material, throughout all or part of the as-molded article, in which concentration gradients vary in the direction from the surface of the article to its interior. It can thus be seen that, for example, unitary parts can be produced which do not suffer from the added expense and engineering of providing an adhesive coating layer, or separate adhesive and coating layers, yet which include a surface-enhancing auxiliary material concentrated at the surface portions of the article where it is most beneficial.

Figure 3:
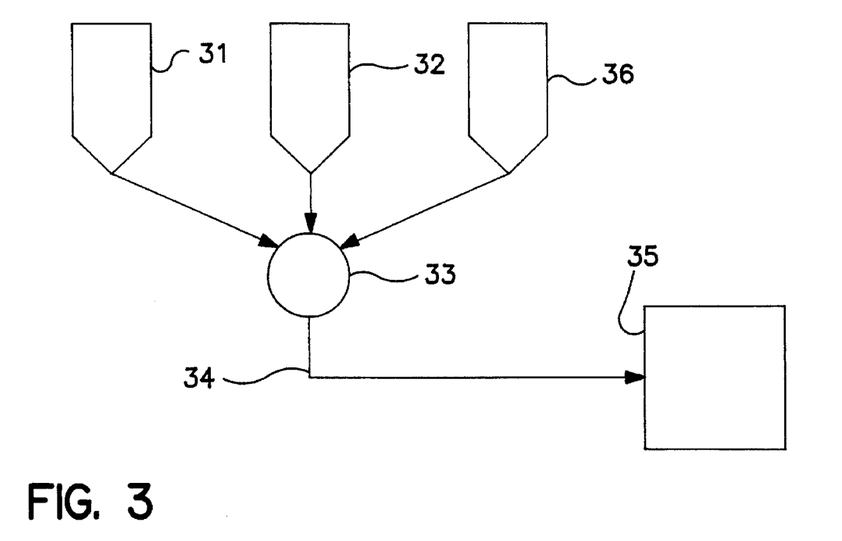
FIGS. 3 and 4 are schematic flow diagrams illustrating other embodiments of the invention.

FIG. 3 depicts another embodiment of the invention, in which vessels 31 and 32 contains a moldable bulk material, with one of the vessels including a catalyst and the other vessel including an activator for the catalyst. The bulk materials from vessels 31 and 32 are joined in mixer 33 and the mixed stream, in which the activator is now activating the catalyst, continues through line 34 and into mold 35. An auxiliary material composition is contained in vessel 36 which, during a particular portion of the time during which the mold is being filled with the moldable bulk material, is admixed with the bulk material in mixer 33 prior to injection.

Figure 2:
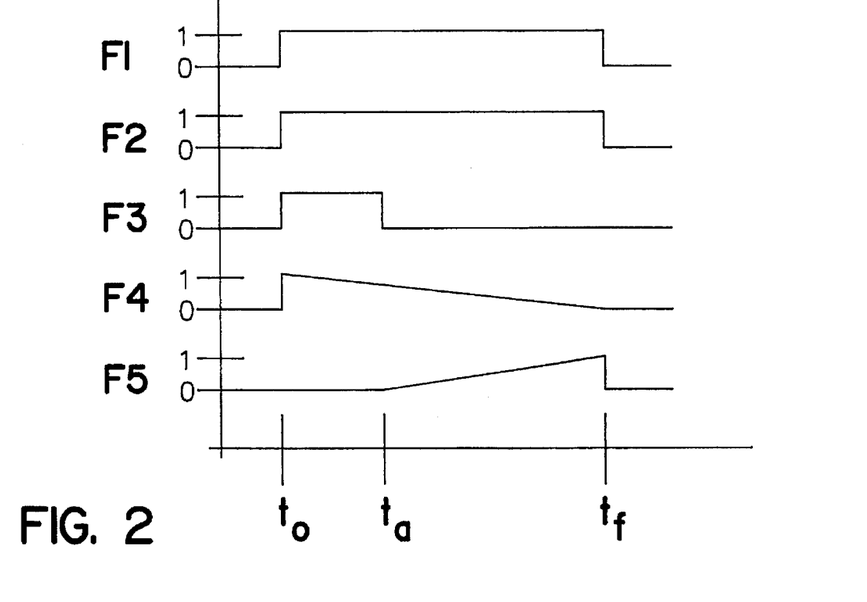
FIG. 2 is a timing diagram depicting various flows in FIG. 1.

Accordingly, in other embodiments of this invention the auxiliary material, rather than having the profile of F3, may have a profile such as F4, in which the flow is continuously decreased, or may have a profile such as F5, in which the material flow is non-existent until some time after initiation of filling the mold, both as shown in FIG. 2. When more than one auxiliary material is added, each of these auxiliary materials may have a different flow characteristic; for example, a surface-enhancing auxiliary material may have the flow profile of F3 while an auxiliary material for enhancing the interior is provided with the flow profile F5.

Still further, improved multilayer articles can be made with this invention. Injecting three bulk materials sequentially (each injected with a step function profile as typified by F3) will provide a multilayer article as produced in the prior art. Using the present invention, one or more auxiliary materials can be admixed with one or more of the bulk materials to provide an article having an auxiliary material disposed in a particular bulk material. This auxiliary material may be concentrated at the surface, interface, interior, or other portion of the particular bulk material, or may be present in a concentration gradient in the direction from the surface to the interior of the article.

Figure 4:
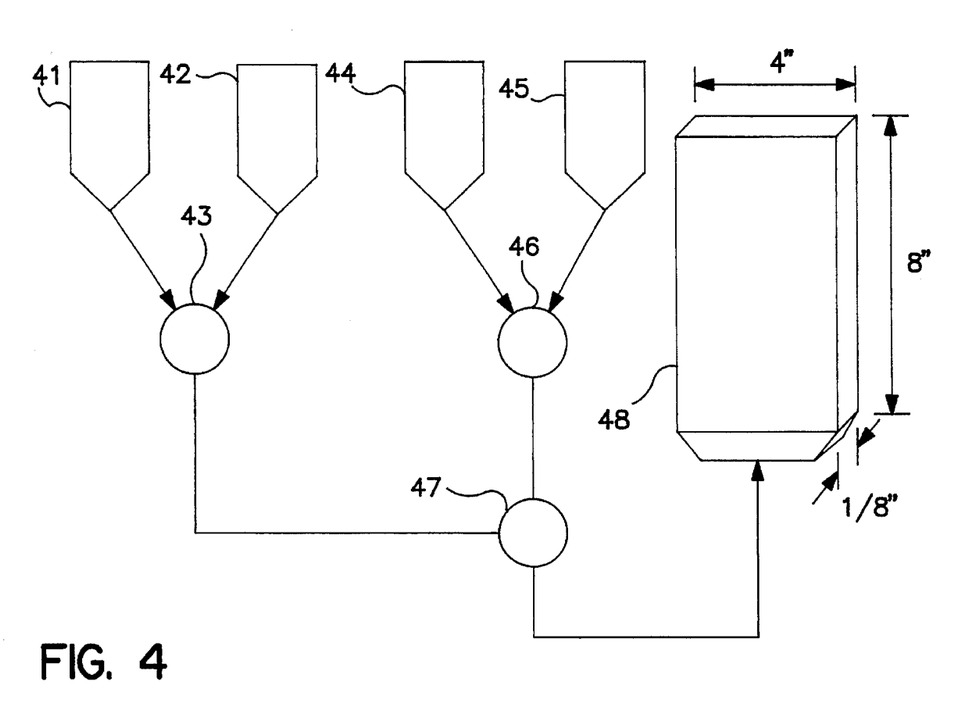

FIG. 4 depicts still another embodiment of the invention, in which vessels 41, 42, 44, and 45 may all contain the same curable thermosettable monomers or prepolymers. The contents of these pairs of vessels are mixed in mixers 43 and 46 to provide a first material and a second material. The exits from these mixers are joined to mixer 47, from which the final material (the first, the second, or a combination of the first and second materials) is injected into mold 48. Vessels 42 and 44 may contain separate auxiliary materials, such as a colorant and an elastomer, respectively. During the first portion of mold filling the first material containing the colorant would be injected to provide a colored exterior, and some time after injection is initiated the elastomer-containing second material would be added to or would replace the flow of the first material through mixer 47 entering mold 48. As described herein, the first and second materials may have the same bulk material composition, whereby a monolithic article is produced.

Variations on the foregoing apparatus include various combinations of the devices shown in FIGS. 1, 3, and 4, such that any number of bulk and/or auxiliary materials can be provided during the molding process.

Figure 6:
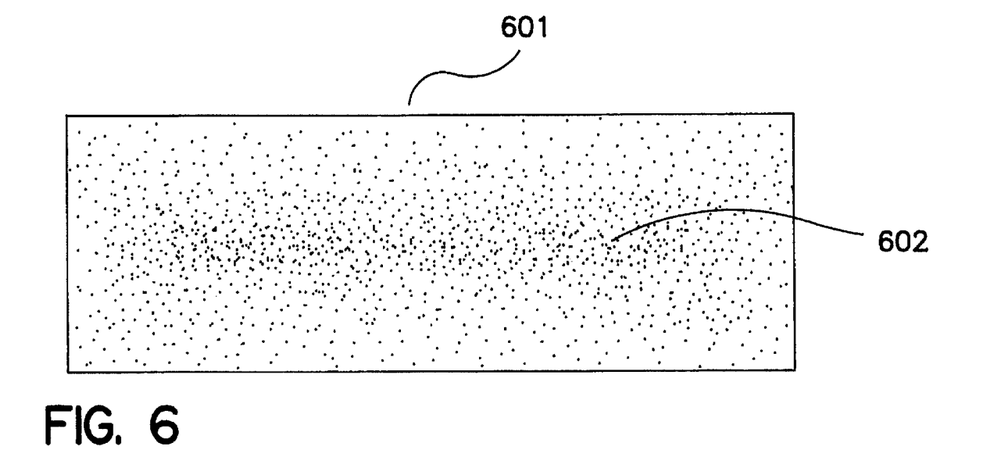
FIGS. 6, 7, and 8 depict idealized cross-sections of different embodiments of articles made using the process of this invention.

Various novel articles can be made using the novel method of this invention. As shown in the idealized cross-section of FIG. 6, this invention can provide a monolithic as-molded article of manufacture comprising a bulk material having a surface portion 601 and an interior portion 602, and an auxiliary material present in the bulk material in a concentration gradient from the surface to the interior, as shown by the shading in FIG. 6. The concentration gradient may be highest near the surface portion and decrease towards the interior, or it may be highest in the interior and decrease towards the surface.

Figure 7:
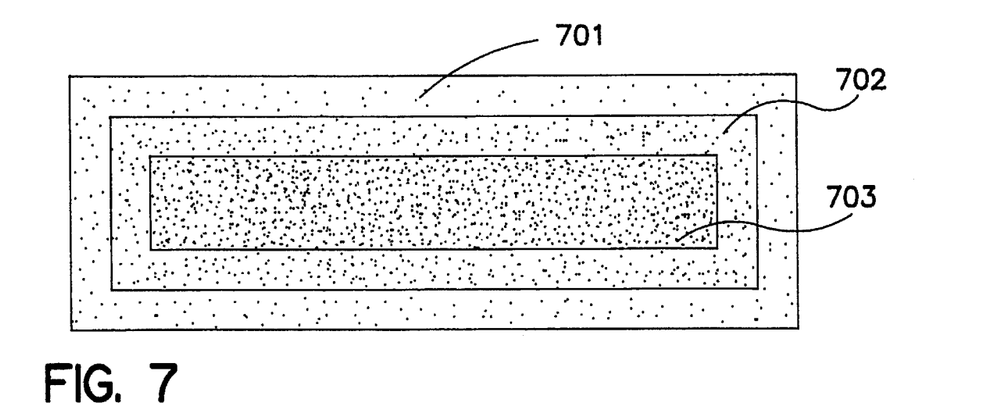

In another embodiment, shown in the idealized cross-section of FIG. 7, this invention can provide a monolithic as-molded article of manufacture comprising a bulk material having an auxiliary material disposed therein at separate particularly fixed concentrations corresponding to discrete portions of the article. For example, the monolith can be provided with a low concentration of the auxiliary material in the surface portion 701, a higher concentration in an intermediate portion 702, and the highest concentration in the interior 703. As shown, rather than having a gradient in the concentration of the auxiliary material, the article comprises fixed concentration strips or pseudolayers of the auxiliary material; the portions containing the auxiliary material are not separate layers because the article is monolithic in the bulk material (i.e., at any point in the article the composition is at least 50% by volume bulk material).

Figure 8:
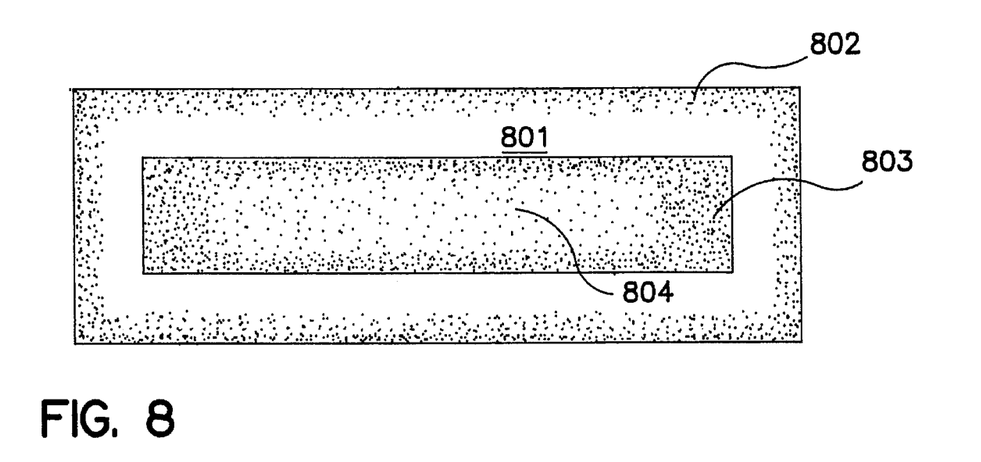

In yet another embodiment, the present invention provides an article having two or more discrete layers of different bulk materials, wherein at least one of the layers includes an auxiliary material disposed in a portion thereof; again, the auxiliary material may be provided as a concentration gradient or as a fixed concentration strip. For example, FIG. 8 depicts an idealized cross-section of an as-molded article comprising a first bulk material 801 on the outside, wherein the first bulk material includes a concentration gradient of an auxiliary material 802 disposed at the surface of the article and being highest at the surface portion and decreasing towards the interior. The first bulk material surrounds an inner, second bulk material 803 which further contains, in the interior portion, an auxiliary material 804 which is at a higher concentration in the interior portion of the second bulk material and decreases in the direction of the surface of the article. Two or more bulk materials can be used with one or more auxiliary materials to provide multicomponent articles having discrete bulk materials wherein at least one of the bulk materials includes an auxiliary material disposed in some portion thereof.

Control Examples C1–C4 and Examples 1–19

An apparatus as shown schematically in FIG. 4 was used to reaction injection mold 1/8" sheets. As shown in idealized form in FIG. 4, two Mini-RIM machines (commercially available from the Department of Chemical Engineering and Materials Sciences, University of Minnesota, Minneapolis, Minn.) were used with a METTON® liquid molding resin system as mentioned above. Each RIM machine included two injection cylinders, represented as vessel pairs 41 and 42, and 44 and 45 respectively. One of the vessels also contained a coloring agents carbon black, in an amount of about 1 wt. %. In each machine, the vessel contents were injected into a common exit port, 43 and 45 respectively, and the mixed effluent from each machine met at an impingement mixer 47 connected to mold 48.

Vessels 41 and 42 generally contained molding resin and catalyst and vessels 44 and 45 generally contained molding resin and an initiator for the catalyst, with the presence of carbon black (colorant) in vessel 45. The particular compositions are shown in Table 1; vessels 41 and 44 contained the A Component and vessels 42 and 45 contained the B Component, and vessels 41 and 42 contained Composition 1 (i.e., A1 and B1) while vessels 44 and 45 contained Composition 2 (A2 and B2); this type of setup is described in further detail in the description of Examples 20–23. In Table 1: RDCPD is a rubberized DCPD composition containing 93.5% DCPD, 3.5% EPDM (ethylenepropylenediene monomer) and 3.0% ENB (ethylidenenorbornene); WOOD catalyst contains 0.139 M $WOCl_2(2,6\text{-dichloro-4-}t\text{-octylphenoxy})_2$ and 0.139 M diglyme (dissolved in DCPD; diglyme is diethylene glycol dimethyl ether, a stabilizer for the catalyst), TOTH (trioctyltin hydride) is the activator for the WOOD catalyst, and TBP (tributyl phosphite) is a moderator for the WOOD catalyst; WOXR catalyst, derived from $WCl_6$, t-butanol, and nonylphenol, and WOXR activator for the catalyst, based on tri-n-octylaluminum and di-n-octylaluminum iodide, are the catalyst and activator used in the examples of U.S. Pat. No. 5,268,232 (the disclosure of which is incorporated herein by reference); and carbon black was provided as a 7.5 wt. % solution in DCPD.

The injection rate was approximately 100 ml/sec. The mold was in the geometry of a sheet having dimensions of 8"×4"×1/8" (height×width×thickness). The mold contained a single gate at the bottom which extended along the entire 4" width of the mold bottom, thus generating a flow front approximately 4" wide and 1/8" thick.

One side of time mold (sheet) was maintained at 80° C. (the "A-Side") and the other side of the mold was maintained at 60° C. (the "B-Side") by heating.

|  | Examples | | | | | |
|---|---|---|---|---|---|---|
|  | C1, C3; and 4, 6, 7, 14–17 | | 10 and 18 | | C2, C4; and 1–3, 5, 8–9, 11–13, 19 | |
| Composition | 1 | 2 | 1 | 2 | 1 | 2 |
| A Component | | | | | | |
| RDCPD monomers (ml) | 900 | 500 | 900 | 500 | 900 | 500 |
| TOTH activator (ml) | 3.66 | 2.03 | 3.66 | 2.03 | | |
| TBP moderator (ml) | 4.26 | 2.37 | 2.13 | 1.18 | | |
| WOXR activator | | | | | 20.06 | 11.14 |
| B Component | | | | | | |
| RDCPD monomers (ml) | 900 | 500 | 900 | 485 | 900 | 485 |
| WOOD catalyst (ml) | 38.25 | 21.25 | 38.25 | 21.25 | | |
| Carbon Black (ml) | 0 | 15 | 0 | 15 | 0 | 15 |
| WOXR catalyst | | | | | 12.2 | 6.8 |
| BHT (g) | 18 | 10 | 18 | 10 | 18 | 10 |

It is preferred to use the above-mentioned RIM machine having a mixing head that automatically recycles the start of the shot (injected) material back into the cylinder to avoid injecting air into the mold.

Figure 5:
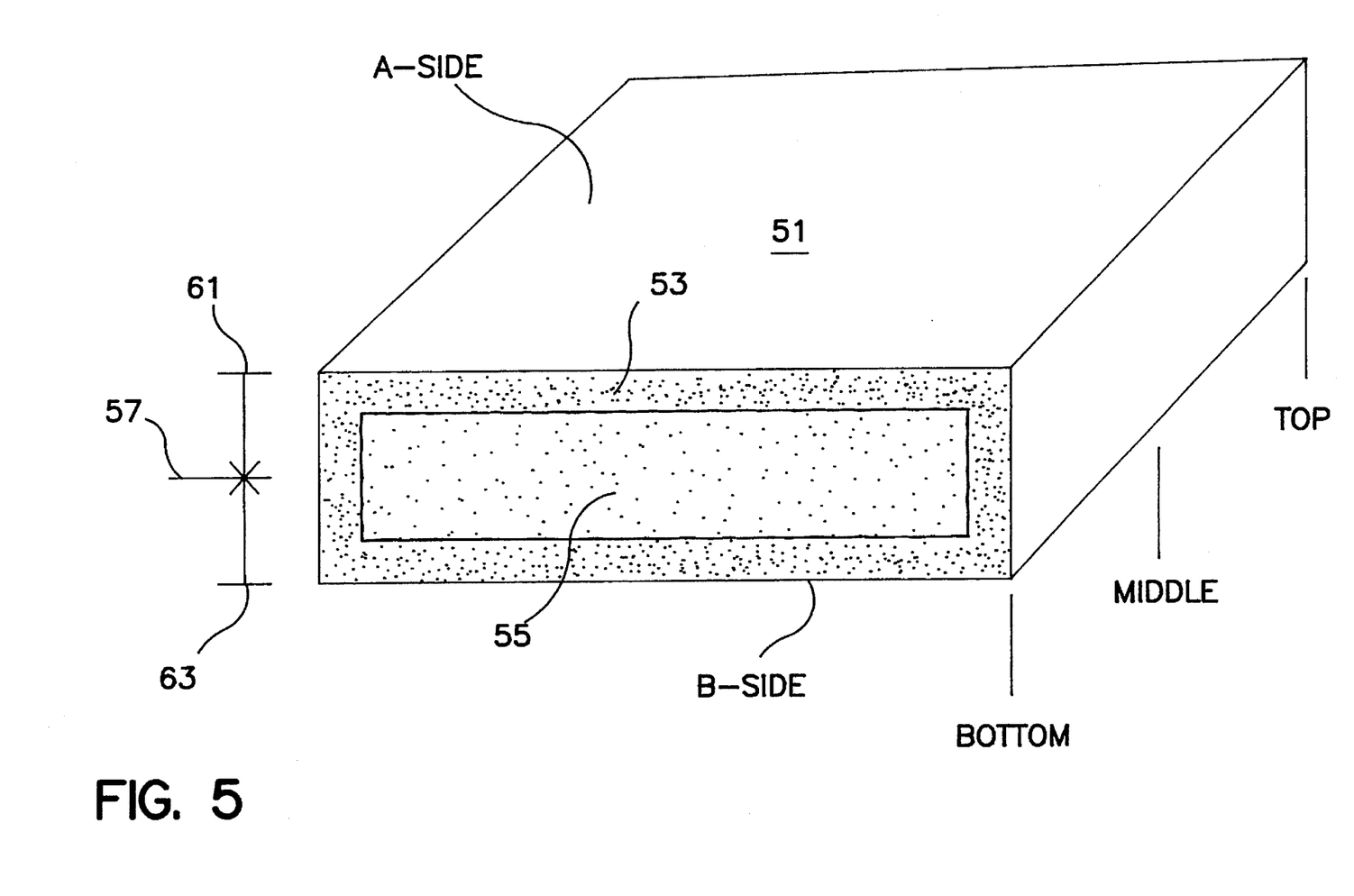
FIG. 5 is an idealized cross-section of an article in the geometry of a sheet made according to the present invention.

A series of RIM experiments were performed where the molding resins containing the carbon black was injected during the first half volume fraction of the mold filling and then shut off. The volume fraction of the colored resin was varied over time in a step function with respect to the total injected flow volume for each injection, as shown by the column "Volume Fraction Black" in Table 2; for instance, Examples 4 and 5 included 30% by volume of material including the carbon black first injected, followed by 70% by volume of material without the carbon black. The results are shown in Table 2. The amount of darkened material was measured from the surface (either the A-Side or the B-side as defined above) to the center of the sheet in the top, middle, and bottom portions of the molded article as shown in FIG. 5. For instance, in Example 4, a cross section of the molded sheet (⅛"= 125 mil) exhibits, at one inch from the top portion of the article, from the A-Side to the middle about 12 mil of black material, from the B-side to the middle about 14 mil of black material, and so 99 mil of uncolored material is present in the interior of the article. This can be visualized with reference to FIG. 5, in which the molded article 51 has a surface portion 53 disposed about an interior portion 55 lacking the carbon black. The middle of the part thickness is depicted by line 57, the measured distance being from the A-Side at line 61 and from the B-Side at line 63 to the center line 57; that is, a value of 50% black material would indicate that the entire half from the respective side to the center line was fully colored. In these examples, the bottom of the part is where the compositions were injected, and the top of the part is thus farthest away from the point of injection. In Table 2, Examples C1 through C4 are controls.

Examples 20–23

Compositions of two reactive components, defined in Tables 3 and 4 as A and B, were formulated using a base material containing dicyclopentadiene (DCPD), ethylidenenorbornene (ENB), and a rubber solution; the rubber solution comprised 3.6% ethylenepropylenediene monomer (EPDM, available as ROYALENE 301 from Uniroyal Chem. Co., Inc., Middlebury Conn.), 93.5% DCPD, and 2.9% ethylidenenorbornene. In the formulation of the A component, trioctyltin hydride (TOTH; available from WITCO/Schering, WITCO GmbH, Bergkamen, GER) and tributylphosphite (TBP) were added to the base composition. In the formulation of the B component, a catalyst solution was added containing 0.139 M $WOCl_2(2,6$-dichloro-4-t-octylphenoxy$)_2$ and 0.139 M diglyme in dicyclopentadiene (see, e.g., Bell, in U.S. Pat. No. 5,082,909, the disclosure of which is incorporated herein by reference). The TOTH is an activator for the catalyst, so that when A and B are mixed curing is initiated; TBP acts to moderate (slow) the rate of reaction.

To either or both of components A and B, as noted in Table 3, an auxiliary material selected from a colorant (7.5% dispersion of carbon black in the base composition), an antioxidant (butylhydroxytoluene, BHT), and/or a co-monomer (tricyclopentadiene, TCPD) was further admixed with one or both of the components A or B.

The compositions were made by anaerobically transferring ingredients into a nitrogen sparged bottle having a rubber cap liner and a metal crimped cap (similar to a soda bottle) for storage until used.

The injection apparatus used for molding was a SEMPAK 200 System (available from SEMCO, Glendale, Calif.) including multicomponent dispensing guns; that is, each injection gun has two separate chambers for different components. For the information given in Table 3, components A and B from composition 1 (A1 and B1) of a particular example were loaded into separate chambers of a dispensing gun, and components A and B from composition 2 (A2 and

TABLE 2

| Example | Volume Fraction Black | % Black 1" from Top of Part | | % Black in Middle of Part | | % Black 1" from Bottom of Part | |
|---|---|---|---|---|---|---|---|
| | | A-Side | B-Side | A-Side | B-Side | A-Side | B-Side |
| C1 | 0 | 0.0 | 0.0 | 0.0 | 0.0 | 0.0 | 0.0 |
| C2 | 0 | 0.0 | 0.0 | 0.0 | 0.0 | 0.0 | 0.0 |
| 1 | 26 | 11.3 | 14.3 | 3.2 | 3.7 | 2.0 | 2.1 |
| 2 | 26 | 9.6 | 11.5 | 3.3 | 5.3 | 0.8 | 1.5 |
| 3 | 26 | 11.8 | 12.0 | 4.7 | 3.9 | 1.5 | 2.8 |
| 4 | 30 | 16.6 | 16.5 | 5.8 | 6.0 | 1.2 | 1.2 |
| 5 | 30 | 21.7 | 22.8 | 6.1 | 7.6 | 4.1 | 1.3 |
| 6 | 34 | 19.2 | 20.7 | 8.3 | 9.7 | 1.2 | 2.4 |
| 7 | 34 | 23.9 | 27.7 | 7.9 | 8.9 | 2.3 | 3.7 |
| 8 | 34 | 23.2 | 21.8 | 9.9 | 10.5 | 1.3 | 1.2 |
| 9 | 34 | 14.8 | 14.5 | 9.0 | 5.2 | 3.6 | 2.6 |
| 10 | 35 | 50.0 | 50.0 | 50.0 | 50.0 | 6.8 | 8.9 |
| 11 | 38 | 21.6 | 25.1 | 9.4 | 9.2 | 3.1 | 3.7 |
| 12 | 43 | 26.3 | 28.9 | 11.7 | 14.1 | 3.1 | 2.2 |
| 13 | 43 | 21.7 | 23.6 | 11.7 | 10.5 | 2.7 | 2.3 |
| 14 | 44 | 50.0 | 50.0 | 14.2 | 11.1 | 3.8 | 4.5 |
| 15 | 44 | 50.0 | 50.0 | 13.6 | 15.3 | 2.3 | 2.9 |
| 16 | 45 | 50.0 | 50.0 | 14.8 | 18.6 | 2.2 | 3.0 |
| 17 | 46 | 50.0 | 50.0 | 26.3 | 21.2 | 4.0 | 5.7 |
| 18 | 46 | 50.0 | 50.0 | 50.0 | 50.0 | 50.0 | 50.0 |
| 19 | 50 | 29.2 | 26.2 | 24.3 | 26.8 | 4.5 | 3.3 |
| C3 | 100 | 50.0 | 50.0 | 50.0 | 50.0 | 50.0 | 50.0 |
| C4 | 100 | 50.0 | 50.0 | 50.0 | 50.0 | 50.0 | 50.0 |

B2) were loaded into separate chambers of another dispensing gun. Each dispensing gun includes a static mixer for mixing the components A and B during injection from the gun. The mixed effluent from the static mixer from each of the two guns were combined and sent through a third static mixer (all static mixers were SEMMIXER mixers, available from SEMCO) and then to the mold. Accordingly, in each of these examples, four separate compositions are employed, with compositions A1 and B1 associated with one dispensing gun and compositions A2 and B2 associated with the other dispensing gun.

During the injection in these examples, equal mixed volumes frown each dispensing gun were sent to the third static mixer and then into the mold. The flow of composition 2 (i.e., A2 and B2) was terminated after a predetermined volume of the composition had been injected, so the later injected material contained only composition 1. That is, the surface portion of the article comprised a mixture of compositions 1 and 2 while the interior portion contained only composition 1.

Example 20 illustrates compositions for forming an as-molded article having a black skin over a non-colored core. Compositions 1 and 2 (with composition 2 having a carbon black colorant) were simultaneously injected in equal volume amounts until about 20% of the mold volume had been filled, and then the injection of composition 2 was terminated while continuing the injection of composition 1. The resulting article had a surface portion comprising about 20 vol. % of the article with carbon black present. The surface of the product was visually black, while cutting the product open showed that the interior was free from carbon black.

Example 21 illustrates a composition for making an as-molded article having a high concentration of an antioxidant selectively directed to its surface portion. As shown, composition B2 contains about 10% BHT, by which composition 2 contains 5%, and thus the surface portion contains 2.5% of the antioxidant BHT. This was verified by taking a microtomed cross-section of the article and using IR spectroscopy; FTIR analysis of a portion 20 μm below the surface exhibited an hydroxyl peak at 3640 cm$^{-1}$ due to the BHT, whereas FTIR analysis at the center of the part did not exhibit this peak.

Example 22 embodies a composition for making an as-molded article having different monomers, here DCPD and tricyclopentadiene (TCPD). In particular, variations of the amounts of the monomers led to changes in impact and thermal properties (such as heat distortion temperature).

TABLE 3

| | EXAMPLE | | | | | | | |
|---|---|---|---|---|---|---|---|---|
| | 20 | | 21 | | 22 | | 23 | |
| Composition | 1 | 2 | 1 | 2 | 1 | 2 | 1 | 2 |
| A Component | | | | | | | | |
| DCPD (g.) | 181.4 | 181.4 | 181.4 | 181.4 | 90.0 | 181.4 | 181.4 | 181.4 |
| ENB (g.) | 5.6 | 5.6 | 5.6 | 5.6 | 0.0 | 5.6 | 5.6 | 5.6 |
| Rubber (g.) | 7.0 | 7.0 | 7.0 | 7.0 | 7.0 | 7.0 | 7.0 | 7.0 |
| TOTH (ml) | 0.81 | 0.81 | 0.81 | 0.81 | 0.81 | 0.81 | 1.29 | 0.23 |

TABLE 3-continued

| | EXAMPLE | | | | | | | |
|---|---|---|---|---|---|---|---|---|
| | 20 | | 21 | | 22 | | 23 | |
| Composition | 1 | 2 | 1 | 2 | 1 | 2 | 1 | 2 |
| TBP (ml) | 0.71 | 0.71 | 0.71 | 0.71 | 0.71 | 0.71 | 0.75 | 0.0 |
| BHT (g.) | 0.0 | 0.0 | 0.0 | 0.0 | 0.0 | 0.0 | 1.88 | 1.92 |
| TCPD (g.) | 0.0 | 0.0 | 0.0 | 0.0 | 97.0 | 0.0 | 0.0 | 0.0 |
| B Component | | | | | | | | |
| DCPD (g.) | 181.4 | 172.3 | 181.4 | 181.4 | 90.0 | 181.4 | 181.4 | 181.4 |
| ENB (g.) | 5.6 | 5.3 | 5.6 | 5.6 | 0.0 | 5.6 | 5.6 | 5.6 |
| Rubber (g.) | 7.0 | 6.6 | 7.0 | 7.0 | 7.0 | 7.0 | 7.0 | 7.0 |
| Catalyst (ml) | 8.5 | 8.5 | 8.5 | 8.5 | 8.5 | 8.5 | 10.06 | 1.785 |
| Carbon black (ml) | 0.0 | 10.0 | 0.0 | 0.0 | 0.0 | 0.0 | 0.0 | 0.0 |
| BHT (g.) | 0.0 | 0.0 | 0.0 | 20.0 | 0.0 | 0.0 | 1.96 | 1.93 |
| TCPD (g.) | 0.0 | 0.0 | 0.0 | 0.0 | 97.0 | 0.0 | 0.0 | 0.0 |
| Mole Ratio Catalyst/Activator per 1000 moles monomer | 0.40/0.60 | | 0.40/0.60 | | 0.40/0.60 | | 0.49/0.73 | 0.50/0.95 | 0.10/0.20 |

Example 22 was repeated essentially as described but using different combinations of the DCPD and TCPD comonomers. The resulting articles Were tested for Gardner impact, notched Izod impact, and heat distortion temperature, with the results shown in Table 4 for Examples 22A–D.

Example 23 represents how a bulk property, such as stiffness (determined by flexural modulus), can be varied by using a higher catalyst concentration in selected portions of the article; in tiffs case, the catalyst was concentrated at the surface. A sample having a high concentration of catalyst throughout the composition has a high, conversion of monomer to polymer and thus a high stiffness throughout; and vice versa for a low concentration of catalyst throughout. A sample having a thin layer of high catalyst concentration only at the surface achieves a high sample stiffness even though the overall conversion of the monomer(s) to polymer is relatively low. Example 23 was repeated essentially as described above using different molar ratios of catalyst/activator per 1000 moles of monomer. The resulting parts were then tested for residual monomer (mole %), flexural modulus, and flexural strength, the results of which are shown in Table 5.

As noted above, catalysts and other necessary or desirable components of an injection molding composition may be quite expensive relative to the cost of the bulk material. As shown in Table 3, molar ratio of catalyst/activator per 1000 moles of monomer is typically about 0.40/0.60. From Table 5, comparing Examples 23A and 23B, it can be seen that the flexural modulus of the molded part of Example 23B is essentially unchanged in spite of a significant decrease in the catalyst/activator amount to approximately one-third of that used in the exterior portion, and a decrease of approximately 20% with respect to that used in Example 23A for the interior portion.

TABLE 4

| Example | Exterior Composition (mole %) | Interior Composition (mole %) | Gardner Impact (in-lb) | Notched Izod Impact (ft-lb/in) | Heat Distortion Temp. (°C.) |
|---|---|---|---|---|---|
| 22A | 97 DCPD plus 3 ENB | 97 DCPD plus 3 ENB | 160 | 10.7 | 108 |
| 22B | 49 DCPD plus 51 TCPD | 49 DCPD plus 51 TCPD | 150 | 1.5 | 148 |
| 22C | 75 DCPD plus 25 TCPD | 49 DCPD plus 51 TCPD | 160 | 1.6 | 146 |
| 22D | 75 DCPD plus 25 TCPD | 97 DCPD plus 3 ENB | 140 | 7.6 | 112 |

TABLE 5

| Example | Exterior catalyst/activator | Interior catalyst/activator | % Residual Monomer | Flexural Modulus (KSI) | Flexural Strength (KSI) |
|---|---|---|---|---|---|
| 23A | 0.50 / 0.95 | 0.50 / 0.95 | 0.75 | 268.1 | 9.74 |
| 23B | 0.30 / 0.575 | 0.10 / 0.20 | 13.3 | 264.7 | 8.34 |
| 23C | 0.10 / 0.20 | 0.10 / 0.20 | >10.0 | 91.2 | 2.18 |

The present invention has been described with reference to the foregoing description and examples without being limited by the particular content thereof, and various additions, substitutions, deletions, and other modifications thereof are intended to be within the scope and spirit of the invention as defined by the following claims.

What is claimed is:

1. A process for making an as-molded article of manufacture composed essentially of a solid resin, wherein a resin-modifying auxiliary material is concentrated in the surface portion of the article, comprising the following steps:

a) injecting into the cavity of a mold over a period of time a liquid that will form a solid resin in the mold, said injecting being conducted in a laminar fashion so that the liquid first coats the wall of the mold cavity, and continuing said injecting until the cavity is substantially full;

b) altering the composition of the injection liquid during said period of injection, without interrupting the injection, by initially incorporating an auxiliary material in the liquid at a first concentration level, and subsequently reducing the concentration of said auxiliary material prior to the end of the injection period, so that the auxiliary material is more concentrated in the portion of the liquid that coats the wall of the mold than it is in the portion of the liquid that is in the center of the mold cavity, said auxiliary material being a material that modifies a property of the resin, and said auxiliary material being mixed into the injection liquid at the beginning of step (a) in an amount that is sufficient to change said property of the resin at the surface of the as-molded article, but which is no more than 50 volume percent of the mixture of liquid and auxiliary material; and c) after the injected liquid forms a solid resin, removing the resultant article from the mold.

2. The process of claim 1 wherein, in step (b), the concentration of the auxiliary material in the injection liquid is reduced in a gradual manner, so as to produce an article which contains a gradient of said auxiliary material, decreasing in concentration from the surface of the article toward the middle of the article.

3. The process of claim 1 wherein, in step (b), the concentration of the auxiliary material in the injection liquid is held substantially constant for a first portion of the injection period, and then is abruptly reduced, so as to produce an article which contains a surface layer that has a substantially uniform concentration of the auxiliary material throughout its thickness.

4. The process of claim 1 wherein the auxiliary material modifies a property of the resin that is selected from the group consisting of color, oxidation resistance, fire resistance, hardness, stiffness, toughness, heat resistance, elasticity, and combinations of two or more of the foregoing.

5. The process of claim 4 wherein the injection liquid forms a solid resin selected from the group consisting of polyalkylene and polycycloalkylenes homopolymers and copolymers, polyureas, polyurethanes, polyester urethanes, including modified polyester urethanes, epoxy resins, phenolic resins, elastomers, and compatible mixtures, blends, and alloys of two or more of the foregoing.

6. The process of claim 4 wherein the injection liquid forms a solid resin that is thermoset.

7. The process of claim 6 wherein the injection liquid includes (i) a reactant selected form the group consisting of dicyclopentadiene, tricyclopentadiene, and mixtures of the foregoing and (ii) effective amounts of a catalyst and a catalyst initiator for the metathesis polymerization of said reactant.

8. The process of claim 7 wherein the auxiliary material is one or more materials selected from the group consisting of carbon black, titanium dioxide, fire resisting phosphorus compounds, fire resisting halogen compounds, fire resisting antimony compounds, alumina trihydrate, butylated hydroxyanisole, butylated hydroxytoluene, substituted and unsubstituted diphenylamines, hindered amine light stabilizers, metal particles and ceramic particles.

9. The process of claim 7 wherein the injection liquid additionally contains ethylidenenorbornene.

10. The process of claim 7 wherein, in step (b), the concentration of the auxiliary material in the injection liquid is reduced in a gradual manner, so as to produce an article which contains a gradient of said auxiliary material, decreasing in concentration from the surface of the article toward the middle of the article.

11. The process of claim 7 wherein, in step (b), the concentration of the auxiliary material in the injection liquid is held substantially constant for a first portion of the injection period, and then is abruptly reduced, so as to produce an article which contains a surface layer that has a substantially uniform concentration of the auxiliary material throughout its thickness.

12. The process of claim 7 wherein the concentration of the auxiliary material in the injection liquid is reduced to zero prior to the end of the injection period, and the composition of the injection liquid is then altered further.

13. A process for making an as-molded article of manufacture composed essentially of a solid resin, wherein a resin-modifying auxiliary material is concentrated in an interior portion of the article, comprising the following steps:

a) injecting into the cavity of a mold over a period of time a liquid that will form a solid resin in the mold, said injecting being conducted in a laminar fashion so that the liquid first coats the wall of the mold cavity, and continuing said injecting until the cavity is substantially full;

b) at some point during the injection period, altering the composition of the injection liquid, without interrupting the injection, by incorporating a greater concentration of an auxiliary material in the liquid than was theretofore being incorporated, so that the auxiliary material is less concentrated in the portion of the liquid that coats the wall of the mold than it is in a portion of the liquid that is more toward the center of the mold cavity, said auxiliary material being a material that modifies a property of the resin, and said auxiliary material being mixed into the injection liquid at some point during step (a) in an amount that is sufficient to change said property of the resin in an interior portion of the as-molded article, but which is less than 50 volume percent of the mixture of liquid and auxiliary material; and c) after the injection liquid forms a solid resin, removing the resultant article from the mold.

14. The process of claim 13 wherein, in step (b), the concentration of the auxiliary material is increased in a gradual manner, so as to produce an article which contains a gradient of said auxiliary material, increasing in concentration in a direction toward the middle of the article.

15. The process of claim 13 wherein, in step (b), the concentration of the auxiliary material is held at zero for a first portion of the injection period, and then is abruptly increased and held constant for a time, so as to produce an article which contains an interior zone that has a substantially uniform concentration of the auxiliary material throughout the zone.

16. The process of claim 13 wherein the auxiliary material modifies a property of the resin that is selected from the group consisting of color, oxidation resistance, fire resistance, hardness, stiffness, toughness, heat resistance, elasticity, and combinations of two or more of the foregoing.

17. The process of claim 16 wherein the injection liquid forms a solid resin selected from the group consisting of polyalkylene and polycycloalkylene homopolymers and copolymers, polyureas, polyurethanes, polyester urethanes, including modified polyester urethanes, epoxy resins, phenolic resins, elastomers, and compatible mixtures, blends, and alloys of two or more of the foregoing.

18. The process of claim 16 wherein the injection liquid forms a solid resin that is thermoset.

19. The process of claim 18 wherein the injection liquid includes (i) a reactant selected from the group consisting of dicyclopentadiene, tricyclopentadiene, and mixtures of the foregoing and (ii) effective amounts of a catalyst and a catalyst initiator for the metathesis polymerization of said reactant.

20. The process of claim 16 wherein the injection liquid includes (i) dicyclopentadiene and (ii) effective amounts of a catalyst and a catalyst initiator for the metathesis polymerization of said dicyclopentadiene.

21. The process of claim 20 wherein the auxiliary material comprises a higher oligomer of cyclopentadiene than the dimer, said higher oligomer being mixed into the dicyclopentadiene in an amount sufficient to make the resin in an interior portion of the as-molded article have a higher heat distortion temperature than the resin at the surface of the article.

22. The process of claim 21 wherein the auxiliary material comprises tricyclopentadiene.

23. The process of claim 19 wherein, in step (b), the concentration of the auxiliary material is increased in a gradual manner, so as to produce an article which contains a gradient of said auxiliary material, increasing in concentration in a direction toward the middle of the article.

24. The process of claim 19 wherein, in step (b), the concentration of the auxiliary material in the injection liquid is held at zero for a first portion of the injection period, and then is abruptly increased and held constant for a time, so as to produce an article which contains an interior zone that has a substantially uniform concentration of the auxiliary material throughout the zone.

25. The process of claim 20 wherein the injection liquid additionally contains ethylidenenorbornene.

* * * * *

UNITED STATES PATENT AND TRADEMARK OFFICE
CERTIFICATE OF CORRECTION

PATENT NO. : 5,464,585
DATED : November 7, 1995
INVENTOR(S) : DENISE R. FITZGIBBON It is certified that error appears in the above-indentified patent and that said Letters Patent is hereby corrected as shown below:

COLUMN 3

Line 44, "rile" should read --the--.

COLUMN 8

Line 8, "stone" should read --same--; and
Line 17, "the; part" should read --the part--.

COLUMN 11

Line 31, "bulk: materials" should read --bulk materials--.

COLUMN 12

Line 3, "agents" should read --agent,--; and
Line 41, "time" should read --the--.

UNITED STATES PATENT AND TRADEMARK OFFICE
CERTIFICATE OF CORRECTION

PATENT NO. : 5,464,585
DATED : November 7, 1995
INVENTOR(S) : DENISE R. FITZGIBBON It is certified that error appears in the above-indentified patent and that said Letters Patent is hereby corrected as shown below:

<u>COLUMN 16</u>

Line 34, "tiffs" should read --this--; and
    Line 36, "high.conversion" should read --high conversion--.

Signed and Sealed this

Seventh Day of January, 1997

Attest:

BRUCE LEHMAN

Attesting Officer     Commissioner of Patents and Trademarks